June 7, 1932.  J. G. PARKIN  1,862,096
ELECTRICAL APPLIANCE
Filed Feb. 12, 1930
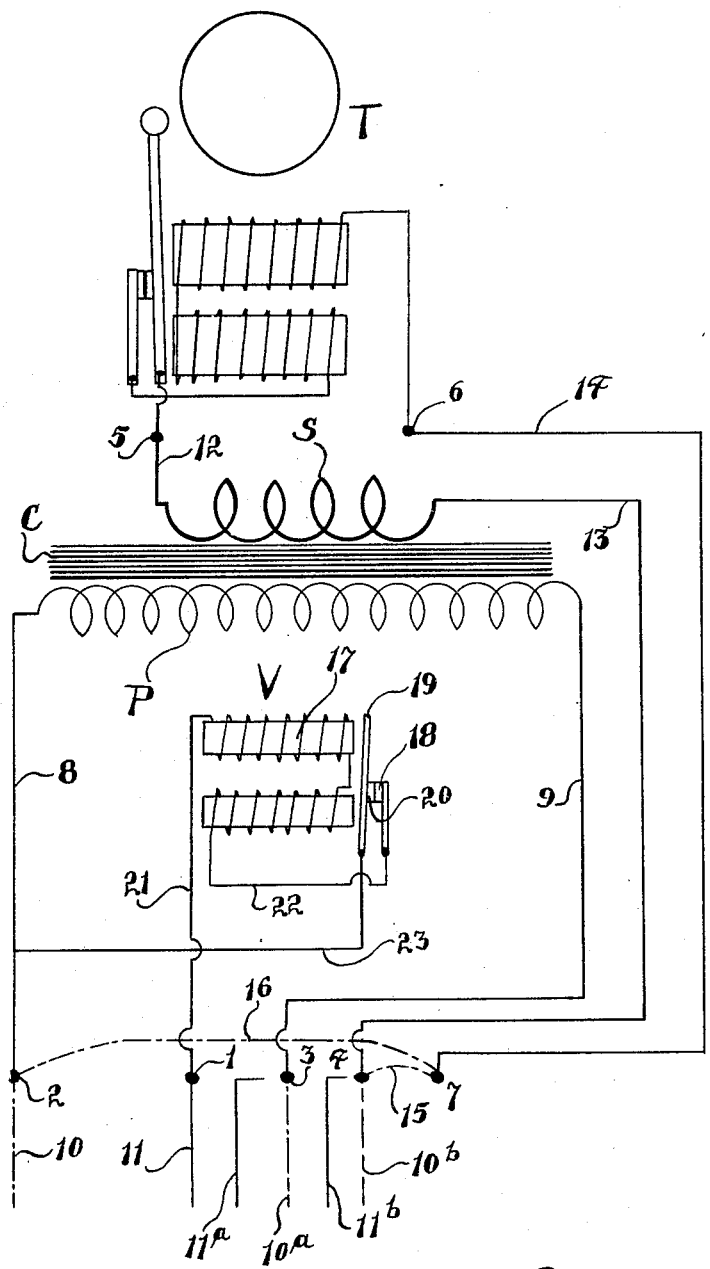
John G. Parkin
INVENTOR
BY Frank P. Wentworth
his ATTORNEY.

Patented June 7, 1932

1,862,096

UNITED STATES PATENT OFFICE

JOHN G. PARKIN, OF NEW YORK, N. Y.

ELECTRICAL APPLIANCE

Application filed February 12, 1930. Serial No. 427,972.

My invention relates to electrical appliances, and more particularly to a device of this character capable of use with either an alternating current or a direct current source for delivering to a translating device, a current of lower potential than that of the source.

In the appliance of the invention, I employ an ordinary step-down transformer, the windings of which are so connected, either directly or through an electrical vibrator, with terminal devices as to permit said transformer to be connected with either an alternating current, or a direct current, source as to the input side of the appliance, and to be connected with a suitable translating device as to the output side of the appliance.

The appliance of my invention may thus be used in an ordinary house lighting circuit, for the purpose of reducing the potential of the current, whether such current is supplied from an alternating current source or from a direct current source. This construction permits the production of what may be termed a "universal" appliance which, from a manufacturing standpoint, is highly desirable, particularly as the additional cost of production of the appliance of my invention, as compared with an ordinary A. C. step-down transformer, is very small, amounting at the most to only a few cents.

The same transformer windings are utilized whether the appliance be used with an alternating current source or with a direct current source, and even when a vibrator is included in the exciting circuit, the wiring of the device, in other respects, and its operative effect is the same with either type of source. I also provide in the device, electrical connections by which the windings of the transformer are utilized as an electrical resistance device for reducing the potential of the current to an extent differing from that result secured by the ratio of the winding of the primary and of the secondary coils of the transformer, which connections may be used with either an alternating or a direct current source.

The main purpose of my invention is to provide a simple and inexpensive electrical appliance of the character above referred to, as an article of manufacture, which will have an increased range of utility by adapting the device for use in any territory using a lighting current of 110–120 volts, irrespective of whether from an alternating or a direct current source.

The invention consists primarily in an electrical appliance embodying therein a step-down static transformer consisting of a core, a primary winding and a secondary winding, an electric vibrator including an electro-magnet, a contact carrying armature, and a fixed contact co-operating therewith, a plurality of input terminal devices, direct electrical connections between the terminals of the primary of said transformer and two of said terminal devices, and electrical connections including said vibrator contacts and the winding of said electro-magnet, between a third terminal device and one of the terminals of said primary winding, output terminal devices, and electrical connections between same and the secondary of said transformer; and in such other novel features of construction and arrangement of parts, as are hereinafter set forth and described, and more particularly pointed out in the claims hereto appended.

In the accompanying drawing, I have illustrated cinventionally an electrical appliance embodying the invention, with a translating device consisting of an ordinary electric bell shown in connection therewith.

The appliance of my invention is a compact, unitary structure capable of use for reducing the potential of the ordinary house lighting circuit to permit the application of this reduced power to various devices, such as door bells, electrical toys and different household appliances wherein the voltage requirements are below those of the ordinary source of power applied to the house lighting circuits.

Its construction is such that it may be made as an article of manufacture for general use in any territory, irrespective of whether the source supplying that territory is an alternating current source or a direct current source. To secure the desired operative effects and universal application of the appliance, I provide certain well known electrical devices, which are so wired in relation to each other and to different terminal devices as to permit the appliance, by the selection of the proper terminal devices, to be used with either an alternating or a direct current source.

Referring to the drawing, it will be understood that all of the devices shown, with the exception of the translating device T, may be embodied in a casing of small compass having only the input and output binding posts exposed exteriorly of the casing.

The input binding posts, four in number, are indicated at 1, 2, 3 and 4. The output binding posts are indicated at 5 and 6. The binding post 6 is an electrical connection with a binding post 7, the sole function of which arrangement is to permit a change in the potential of the output current without a material reduction in the voltage thereof.

The appliance is provided with an ordinary bell ringing transformer, consisting of a core C, a primary winding P and a secondary winding S, the ratio of the windings P and S, and the diameter of the wire therein being such as to step the current down from the voltage of the source to that most commonly used, about six volts.

One terminal of the transformer primary winding is connected by the lead line 8 with the binding post 2, and the other terminal of this winding is connected by the lead line 9 with the binding post 3, this binding post being the return connection of the appliance whether it be used with either an alternating or a direct current source. The binding post 1 is adapted for use with a direct current source and the binding post 2, with an alternating current source, the binding post 3 being connected with the return side of either an alternating or a direct current source. The alternating current line from the source is indicated in dotted lines at 10 and 10a, while the leads from the direct current source are indicated at 11 and 11a.

The transformer secondary winding S has one terminal thereof in direct electrical connection through the lead 12 with one terminal of the translating device T, and the other terminal of said secondary is in electrical connection with the binding post 4 through the lead 13. The terminal of the translating device T, other than that connected with the lead 12, is connected by the lead 14 with the binding post 7.

When it is desired to operate the translating device at a voltage determined by the ratio of the windings P and S, a jump connection 15 is made across the binding posts 4 and 7. When, however, it is desired to cut down the potential of the line without any substantial reduction in voltage, the jump connector 15 is dispensed with, and a jump connector 16, between the binding posts 2 and 7 is used, the binding post 4 being used as one terminal of the input circuit. When the jump connector 16 is used, the lead 10 or the lead 11, according to whether the source is an alternating or a direct current, may be connected with the binding post 4, as indicated at 10b and 11b.

The appliance is also provided with an ordinary vibrator V having an electro-magnet 17, a fixed contact 18 in electrical connection with the winding of said magnet, and an armature 19 carrying a contact 20 co-operating with the contact 18. One terminal of the winding of the magnet 17 is in direct electrical connection, through the lead 21, with the binding post 1. The other terminal of this winding is connected with the fixed or the movable contact member 18 or 19, through the lead 22, the former connection being shown in the drawing. The contact of the pair 18—19, which is not connected with the winding of the magnet 17, is in direct electrical connection, through the lead 23, with one terminal of the primary winding P of the transformer.

An appliance constructed as above described, may be manufactured for general distribution and be capable of use in any territory in which the voltage of the service lines is within the range for which the primary winding P is designed for use.

In use, the manner of making the connection with the various power lines will be determined by the character of the current available. If the territory is served from an alternating current source, the user merely connects the lead lines 10—10a from the source with the binding posts 2 and 3. When so connected, the transformer will function as an ordinary step-down transformer, the secondary of which will deliver, under ordinary circumstances, from five and one-half to six volts without rectification. If the appliance is to be used with an ordinary electric bell or a toy requiring the low voltage referred to, the output binding posts 5 and 6 are to be connected with the translating device, whether this be an ordinary electric bell or other device.

Assuming that the available source is a direct current, the user will take the terminal leads 11—11a and connect them respectively with the binding posts 1 and 3, thus including the winding of the magnet 17 and both contacts 18 and 20 of the vibrator V in the circuit with the primary winding P of the transformer and securing substantially the same step-down effect as is secured by the action of the transformer when connected with an A. C. source, the secondary winding S of the transformer delivering current at the same voltage as though the appliance were connected with an A. C. source.

When it is desired to deliver a low voltage by making the connections above referred to, it is essential, to complete the secondary circuit, to use a jump connector 15 between the binding posts 4 and 7.

If it is desired to reduce the potential of the current delivered without any material reduction in the voltage, the user removes the jump connector 15 and connects the binding posts 2 and 7 with the jump connector 16, and connects one of the leads 10a or 11a, according to whether alternating or direct current is available, with the binding post 3, connecting the lead 10b or 11b of the other side of the line with the binding post 4.

By thus wiring the appliance, it will be noted that the resistance of the primary and of the secondary windings and of the translating device are connected in series, current flowing first through the secondary winding S, then through the translating device, and then through the primary winding P to the return side of the line at the binding post 3. This wiring may sometimes be used with certain lighting devices as a translating device.

The appliance of the invention was designed primarily as an article of manufacture capable of use in a number of different connections, which use would not be circumscribed by the character of the current source in different localities.

It is not my intention to limit the invention to the use of any particular type of translating device, or to the precise details of construction shown in the accompanying drawing, it being apparent that switches may be used in lieu of jump connections, as shown, at but little additional cost.

Having described the invention, what I claim as new and desire to have protected by Letters Patent is:—

1. An electrical appliance embodying therein a step-down static transformer consisting of a core, a primary winding and a secondary winding, an electric vibrator including an electro-magnet, a contact carrying armature, and a fixed contact cooperating therewith, a plurality of input terminal devices, direct electrical connections between the terminals of the primary of said transformer and two of said terminal devices, and electrical connections including said vibrator contacts and the winding of said electro-magnet, between a third terminal device and one of the terminals of said primary winding, output terminal devices, and electrical connections between same and the secondary of said transformer.

2. An electrical appliance embodying therein a step-down static transformer consisting of a core, a primary winding and a secondary winding, an electric vibrator including an electro-magnet, a contact carrying armature, and a fixed contact cooperating therewith, a plurality of input terminal devices, direct electrical connections between the terminals of the primary of said transformer and two of said terminal devices, and electrical connections including said vibrator contacts and the winding of said electro-magnet, between a third terminal device and one of the terminals of said primary winding, output terminal devices, additional terminal devices, electrical connections between one of said additional terminal devices and one of said output terminal devices, and electrical connections between the other of said additional terminal devices and one terminal of said secondary winding, whereby electrical connections between said additional terminal devices will close the secondary circuit of said transformer, and an electrical source may be connected with additional devices in electrical connection with the secondary winding of the transformer, and the other of said additional devices may be connected with the input terminal device connected directly with the primary winding of said transformer, and the resistance of both windings of said transformer be included in series in a circuit.

In witness whereof I have hereunto affixed my signature this 10th day of February, 1930.

JOHN G. PARKIN.